(12) United States Patent
Fu et al.

(10) Patent No.: US 9,260,318 B2
(45) Date of Patent: Feb. 16, 2016

(54) MESOPOROUS TITANIUM DIOXIDE NANOPARTICLES AND PROCESS FOR THEIR PRODUCTION

(71) Applicant: Cristal USA Inc., Hunt Valley, MD (US)

(72) Inventors: Guoyi Fu, Ellicott City, MD (US); Mark Watson, Kensington, MD (US)

( * ) Notice: Subject to any disclaimer, the term of this patent is extended or adjusted under 35 U.S.C. 154(b) by 0 days.

(21) Appl. No.: 14/528,259

(22) Filed: Oct. 30, 2014

(65) Prior Publication Data

US 2015/0057151 A1 Feb. 26, 2015

Related U.S. Application Data

(62) Division of application No. 13/297,869, filed on Nov. 16, 2011, now Pat. No. 8,900,705.

(51) Int. Cl.
| | |
|---|---|
| *C22B 34/12* | (2006.01) |
| *C01G 23/053* | (2006.01) |
| *B82Y 30/00* | (2011.01) |
| *B82Y 40/00* | (2011.01) |

(52) U.S. Cl.
CPC ............. *C01G 23/0538* (2013.01); *B82Y 30/00* (2013.01); *C01G 23/0536* (2013.01); *B82Y 40/00* (2013.01); *C01P 2004/03* (2013.01); *C01P 2004/32* (2013.01); *C01P 2004/64* (2013.01); *C01P 2006/12* (2013.01); *C01P 2006/14* (2013.01); *C01P 2006/16* (2013.01); *C01P 2006/17* (2013.01); *Y10T 428/2982* (2015.01)

(58) Field of Classification Search
CPC .... C01G 23/053; C01G 23/0532; C01G 5/36; C09C 1/363; Y10T 428/2982; C01P 2004/64; C01P 2006/16; C01P 2006/17

USPC .................. 423/69, 75, 76, 610, 86; 428/402
See application file for complete search history.

(56) References Cited

U.S. PATENT DOCUMENTS

| | | | | |
|---|---|---|---|---|
| 6,399,540 | B1 * | 6/2002 | Oki et al. ...................... | 502/350 |
| 7,645,439 | B2 * | 1/2010 | Toledo Antonio et al. ... | 423/609 |
| 8,329,139 | B2 * | 12/2012 | Ciccarella et al. ............ | 423/610 |
| 2006/0110316 | A1 | 5/2006 | Torardi | |
| 2010/0051877 | A1 * | 3/2010 | Wei et al. ................... | 252/408.1 |
| 2010/0080752 | A1 * | 4/2010 | Hayashi .................... | A61K 8/29 |
| | | | | 423/610 |
| 2010/0311576 | A1 | 12/2010 | Toledo Antonio et al. | |
| 2011/0171533 | A1 | 7/2011 | Torardi | |

FOREIGN PATENT DOCUMENTS

| | | |
|---|---|---|
| CN | 101049555 | 10/2007 |
| CN | 101391811 | 3/2009 |

(Continued)

OTHER PUBLICATIONS

Bleta, Rudina, et al., "Nanoparticle Route for the Preparation in Aqueous Medium of Mesoporous TiO2 with Controlled Porosity and Crystalline Framework", The Journal of Physical Chemistry C, vol. 114, No. 5, 2010, pp. 2039-2048.

(Continued)

*Primary Examiner* — Holly Le
(74) *Attorney, Agent, or Firm* — Dunlap Codding, P.C.

(57) ABSTRACT

TiO$_2$ nanoparticles having improved consistent particle morphology, uniform particle size, and which contain uniform intra-particle pores in the mesopore size range are produced by wet chemical hydrolysis.

4 Claims, 4 Drawing Sheets

(56) References Cited

FOREIGN PATENT DOCUMENTS

| | | |
|---|---|---|
| CN | 101481139 | 7/2009 |
| KR | 10-2009-0080205 | 7/2009 |

OTHER PUBLICATIONS

Chen, Hao, et al., "Synthesis of Thermally Stable Mesoporous Titania Nanoparticles Via Amine Surfactant-Mediated Templating Method", Materials Chemistry and Physics 96, 2006, pp. 176-181.

Choi, Eun Hyung, et al., "Preparation of Thermally Stable Mesostructured Nano-sized TiO2 Particles by Modified Sol-Gel Method Using Ionic Liquid", Catalysis Letters, 2008, vol. 123, pp. 84-89.

Das, Swapan K., et al., "Self-Assembled TiO2 Nanoparticles: Mesoporosity, Optical and Catalytic Properties", Dalton Transactions, 2010, vol. 39, pp. 4382-4390.

Deshpande, S.B., et al., "Room Temperature Synthesis of Mesoporous Aggregates of Anatase TiO2 Nanoparticles", Materials Chemistry and Physics 97, 2006, pp. 207-212.

E-Y. Kim et al., "Synthesis of Mesoporous $TiO_2$ and Its Application to Photocatalytic Activation of Methylene Blue and *E. coli*", Bull. Korean Chem. Soc., 2009, pp. 193-196, vol. 30, No. 1, Korean Chemical Society, Seoul, Korea.

International Search Report and Written Opinion (PCT/US2012/065317); Mar. 22, 2013.

J-G. Yu et al., "The effect of F-doping and temperature on the structural and textural evolution of mesoporous $TiO_2$ powders", Journal of Solid State Chemistry, 2003, pp. 372-380, vol. 174, Elseview, Amsterdam, Netherlands.

Wu, Zhiwang, et al., "Aerosol-Assisted Synthesis of Mesoporous Titania Nanoparticles with High Surface Area and Controllable Phase Composition", Journal of Sol-Gel Science and Technology, 2010, vol. 53, pp. 287-292.

Lee, Dong-Wook, et la.,"Synthesis of Bimodal Mesoporous Titania With High Thermal Stability via Replication of Citric Acid-Templated Mesoporous Silica," Chemistry of Materials, vol. 19, No. 4, pp. 937-941; Jan. 23, 2007.

State Intellectual Property Office of the People's Republic of China Search Report (CN 201280062004.1); Mar. 24, 2015.

* cited by examiner

MESOPOROUS TITANIUM DIOXIDE NANOPARTICLES AND PROCESS FOR THEIR PRODUCTION

CROSS-REFERENCE TO RELATED APPLICATIONS

This application is a divisional of U.S. application Ser. No. 13/297,869, filed Nov. 16, 2011, the entirety of which is hereby expressly incorporated herein by reference.

BACKGROUND OF THE INVENTION

The presently disclosed and claimed inventive concept(s) relate generally to mesoporous titanium dioxide ($TiO_2$) nanoparticles, and more particularly, to a new type of $TiO_2$ nanoparticles which are highly uniform in particle size and contain generally uniform intra-particle pores in the mesopore size range.

Porous nanoparticles, especially those with well defined pores and a narrow pore size distribution, have high application potentials in catalysis, as catalyst supports, adsorbents, in optics, photovoltaics, and filtration materials for separation. Control of particle microstructure allows control of physical and electronic properties, which, in turn, leads to new functionalized materials.

U.S. Patent Application Pub. Nos. 2006/0110316 and 2011/0171533 relate, respectively, to mesoporoous metal oxides and to a mesoporous oxide of titanium which can be produced by precipitating an ionic porogen and a hydrous oxide of the metal, i.e., titanium, compound comprising a titanium starting material, a base and a solvent, wherein the titanium starting material or the solvent or both are a source of the anion for the ionic porogen and the base is the source of the cation for the ionic porogen. The ionic progen is removed from the precipitate, and the mesoporous oxide of titanium is recovered. However, there is a need for a process for preparing $TiO_2$ nanoparticles that demonstrate consistent particle morphology, uniform particle size, spherical shape, and which contain uniform intra-particle pores in the mesopore size range.

SUMMARY OF THE INVENTION

The presently disclosed and claimed inventive concept(s) relates to an oxide of titanium, i.e., $TiO_2$, in the form of a generally uniform spherical nanoparticle of from about 20 nm to about 100 nm in size wherein each particle comprises generally uniform intra-particle mesopores having a substantially uniform pore size distribution centered at a value between about 2 nm to about 12 nm. In a preferred embodiment, the $TiO_2$ nanoparticles are generally spherical in the range of 50 nm in size and exhibit intra-particle mesopores centered at about 6 nm.

The $TiO_2$ nanoparticles are a powder material wherein the nanoparticles exhibit a bimodal pore size distribution. One mode is from the intra-particle pores mentioned above, i.e., the pores within individual nanoparticles. The other mode originates from the packing arrangement of the nanoparticles, that is, the inter-spacial pores, with a substantially uniform pore size distribution centered between about 15 nm to about 80 nm. In a preferred embodiment, the $TiO_2$ powder material formed by this type of nanoparticles has a substantially uniform inter-particle pore size distribution centered at about 35 nm.

The $TiO_2$ nanoparticles according to the presently disclosed and claimed inventive concept(s) are produced by:

(i) forming an aqueous solution of a water soluble compound of titanium at a concentration of from 0.5 to 1.5 moles per liter in the presence of an organic mineral acid at an acid to titanium molar ratio of from 0.02 to 0.2;

(ii) heating the aqueous solution to a temperature in the range of from 70° C. to 80° C. and maintaining that temperature for a period of from 1 hour to 3 hours, and then heating the aqueous solution to a temperature in the range of from 100° C. up to the refluxing temperature and maintaining that temperature for an additional period of from 2 hours to 4 hours;

(iii) cooling the solution to room or ambient temperature, i.e., a temperature in the range of 25° C., and separating the reaction product.

The process of the invention is capable of producing a consistently uniform particle size for this type of $TiO_2$ nanoparticle that can be controlled at a size range of from about 20 nm to about 100 nm. The intra-particle mesopores exhibit a narrow pore size distribution centered at a value between about 2 nm to about 12 nm. The powder material from this type of nanoparticles also exhibit substantially uniform inter-particle pores with a pore size distribution centered between about 15 nm to about 80 nm. Pore size distribution measurements via $N_2$ adsorption (BET) on one of this type of nanoparticle products reveal that the material has two types of mesopores. One type of mesopore, i.e., the intra-particle mesopore, is centered at about 6 nm, which has also been observed by SEM. The other type of pores is centered at about 35 nm, and these are believed to be inter-particle pores generated by the packing arrangement of the individual nanoparticles. Nanoparticle materials produced according to the described and claimed inventive concept(s) have a pore volume of from 0.2 to 0.6 $cm^3/g$ as measured by $N_2$ adsorption (BJH).

DETAILED DESCRIPTION OF THE INVENTION

Figure 1A:
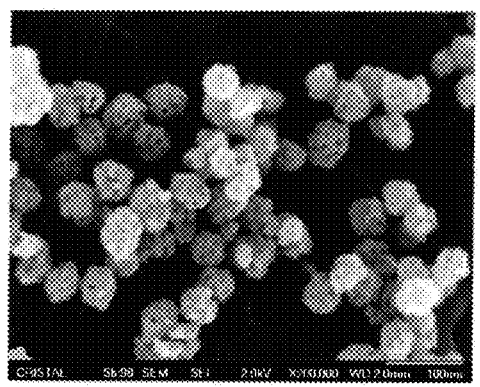
FIGS. 1A and 1B depict scanning electron microscope (SEM) images of SEM images of mesoporous $TiO_2$ nanoparticle samples produced according to the inventive concepts described herein.

The disclosed and claimed inventive concept(s) are directed to a process for producing a type of $TiO_2$ nanoparticles which are highly uniform in particle size and contain uniform intra-particle pores in the mesopore size range with a relatively narrow pore size distribution. As used herein, the term "mesoporous" or "mesopore size range" means structures having an average pore diameter of from 2 nm to 100 nm (20 Å up to 1000 Å), although the average pore diameters of the structures are generally smaller than 100 nm depending on the morphology of the nanoparticles, which in turn depends on the titanium precursor material, i.e., the water soluble compound of titanium, and the entity of the organic acids used in the process.

The highly uniform and generally spherical $TiO_2$ nanoparticles of the invention are produced by:
(i) forming an aqueous solution of a water soluble compound of titanium at a concentration of from 0.5 to 1.5 moles per liter in the presence of an organic acid at an acid to titanium molar ratio of from 0.02 to 0.2;
(ii) heating the aqueous solution to a temperature in the range of from 70° C. to 80° C. and maintaining that temperature for a period of from 1 hour to 3 hours, and then heating the aqueous solution to a temperature in the range of from 100° C. up to the refluxing temperature and maintaining that temperature for an additional period of from 2 hours to 4 hours;
(iii) cooling the solution to room or ambient temperature, and separating the reaction product.

The reaction product is typically separated as a powder, and the powder is then treated to remove solvent (e.g., water) from the pores, such as, for example, by heating the powder at a controlled temperature in the range of from 200° C. to 500° C.

As noted above, preparation of mesopopous $TiO_2$ nanoparticles according to the described and claimed inventive concept(s) begins with preparing precursor nanoparticles by wet chemical hydrolysis. A typical hydrolysis process involves the following steps:

Dissolving a water soluble compound of titanium in distilled or deionized water at a titanium concentration of 0.5 to 1.5 moles per liter. Optionally, a small amount of an inorganic acid can be added to control the solution pH and function as a hydrolysis catalyst to speed up the hydrolytic reaction. A suitable amount of an organic acid is then added to the reaction mixture typically at an acid to titanium molar ratio of 0.02 to 0.2. The organic acid has been observed to function as a morphology controlling agent.

The solution, i.e., reaction mixture, thus formed is transferred to a heated reactor equipped with a condenser, and the solution is heated to a temperature between about 70° C. and 80° C. As an option, anatase $TiO_2$ seeds can be added to the solution at a seed to $TiO_2$ molar ratio of from 0.0005 to 0.0015 while maintaining the same solution temperature for a period of from 1 hour to 3 hours. The $TiO_2$ seeds operate to control the crystalline phase and particle size of the nanoparticles. Thereafter the reactor temperature is raised to a value in the range of from 100° C. up to the refluxing temperature and maintained at that temperature for an additional period of from 2 hours to 4 hours.

The reaction is then cooled to room or ambient temperature, and the reaction product can be separated by filtration and then washed with deionized water until it is substantially free of the salts generated during hydrolysis. The reaction mixture can also be neutralized with a base, such as, for example, an ammonia solution, a sodium hydroxide solution, and the like, before filtration and washing.

The precursor nanoparticles thus formed are then treated to remove adsorbed water and residue acid molecules from their pores to produce the mesoporous nanoparticles of the invention. This treatment can be accomplished in a number of different ways known to those skilled in the art. For example, common organic solvents which are miscible with water, such as ethanol, propanol, acetone, tetrahydroforan, and the like, may be used to extract water from the precursor nanoparticles. Low temperature drying, e.g., in the temperature range of from 60° C. to 150° C., may be necessary to remove the solvents after extraction. Strong desiccants may also be used to remove adsorbed water from the nanoparticles. For example, phosphorus pentoxide or concentrated sulfuric acid may be used to dry the nanoparticles in a desiccator with the sample sitting over the desiccants. A few days may be required for the adsorbed water to be completely removed from the mesopores. In certain cases, when detected, organic acid residue, such as citrate molecules, may need to be removed to further free up the pores. Organic acid residue may be removed by washing the nanoparticles with a salt solution, such as ammonium bicarbonate, after they have been washed with deionized water. A simple, effective and preferred method for removing adsorbed water and a majority of the residue acid molecules is by heating the nanoparticles in an oven at a temperature of from 200° C. to 500° C. under a constant air flow.

For the precursor materials for preparing the $TiO_2$ nanoparticles according to the inventive concept(s) described and claimed herein, any water soluble compounds of titanium may be used in the thermal hydrolysis. These include, but are not limited to, titanium oxychloride, titanium oxysulfate, and the like; titanium potassium oxalate and the like; titanium bis(ammonium lactate) dihydroxide, bis-acetylacetone titanate and other water soluble titanium complexes. Suitable organic acids for use in the process are alpha hydroxyl carboxylic acids and include citric acid, tartaric acid, malic acid and the like. Citric acid is preferred in cases where nanoparticles having a spherical shape are desired.

Figure 1B:
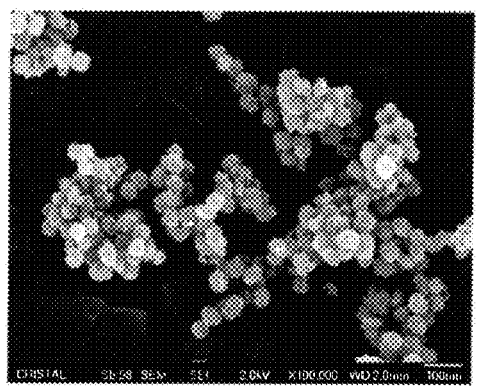

The SEM images shown in FIGS. 1A and 1B depict spherical mesoporous $TiO_2$ nanoparticles produced according to the inventive concepts described herein. The $TiO_2$ particles are highly uniform in particle size, with the samples shown in FIGS. 1A and 1B having a particle size of about 50 nm. The intra-particle pores are about a few nanometers in size, and they can be clearly seen under SEM. BET measurements indicate that the samples exhibit a bimodal pore size distribution with one type of pores centered at about 6 nm, which are the same intra-particle pores observed under SEM. The nanoparticles exhibit a narrow pore size distribution which can be centered, for example, at 6 nm, 10 nm, 12 nm, etc. The other type of pores observed are centered at about 35 nm, which is believed to be pores that are formed by the packing arrangement of the individual 50 nm nanoparticles. Both types of the pores are in the mesopore size range.

Example 1

1,196 g deionized water, 79 g hydrochloric acid solution (37% from Fisher Scientific), 5.9 g citric acid monohydrate (from Alfa Aesar) and 398 g titanium oxychloride solution (25.1% in $TiO_2$, from Millennium Inorganic Chemicals) were mixed together in a heated reactor equipped with a glass condenser and an overhead stirrer. While being constantly stirred, the mixture was heated to 75° C. and a small amount of anatase $TiO_2$ seeds (0.1% vs. $TiO_2$; anatase seeds were produced by Millennium Inorganic Chemicals) was quickly introduced. The reaction was maintained at 75° C. for 2 hours. During this period, $TiO_2$ particles began to form through hydrolysis of the titanium oxychloride. The reaction temperature was then increased to 103° C., and the reaction mixture was maintained for 3 hours at that temperature. The hydrolysis was essentially complete at this stage.

Figure 2:
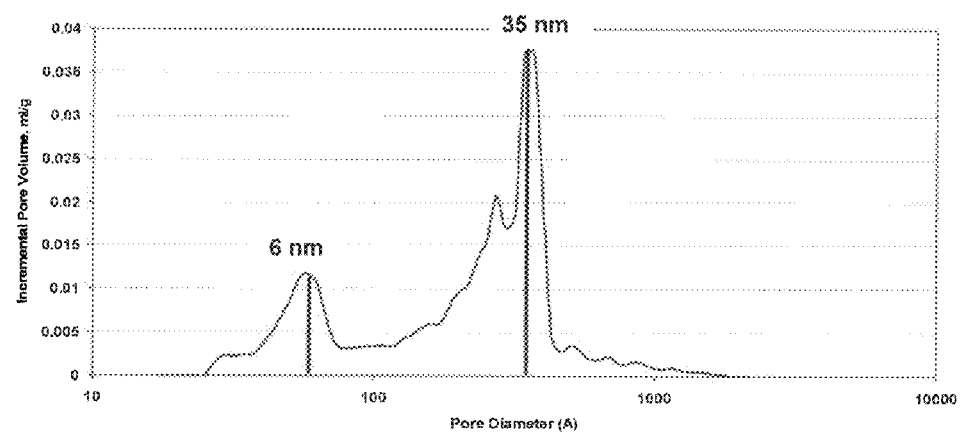
FIG. 2 is a pore size distribution plot of the $TiO_2$ nanoparticles produced according to the inventive concepts described in Example 1.

The reaction mixture was then cooled to room temperature and transferred to a different container where the particles formed during the reaction were allowed to settle for a few hours. After substantially all of the particles had settled to the bottom of the container, the mother liquor was removed and about the same amount of deionized water was added. The mixture was stirred to re-slurry the particles, and then the pH of the slurry was increased to about 7 by slow addition of an ammonia solution (~29%, Fisher Scientific). The particles were then separated from the liquid using a Buchner filter and washed with deionized water until the conductivity of the filtrate was lowered to about 5 mS/cm. Then the filter was filled with an ammonia bicarbonate solution having a solution conductivity of about 5 mS/cm. The ammonia bicarbonate washed material was then heated in an oven at 300° C. for 6 hours under a flow of air. SEM measurement of the material showed that the particles prepared by this process were spherical in shape and had an average particle size of about 50 nm. Each particle exhibited intra-particle mesopores of about a few nanometers in size (FIGS. 1A and 1B). BET measurement results showed that the material had a surface area of 121 $m^2$/g and a pore volume of 0.6 $cm^3$/g. X-ray diffraction (XRD) measurement showed an anatase crystallite size of 11.9 nm. The pore size distribution plot shown in FIG. 2 indicates that the material exhibited a substantially bimodal pore size distribution centered at about 6 nm and 35 nm, respectively.

Example 2

Figure 3:
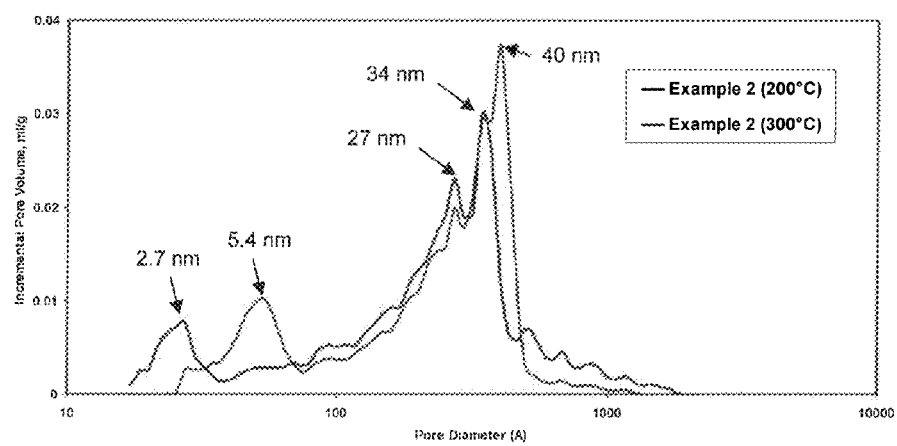
FIG. 3 is a pore size distribution plot of the $TiO_2$ nanoparticles produced according to the inventive concepts described in Example 2 with one sample treated at a temperature of 200° C. and a second sample treated at a temperature of 300° C.

TiO$_2$ nanoparticle samples were produced as described above in Example 1 except that 0.15% (vs. TiO$_2$) anatase seeds were used instead of 0.1%. One half of the reaction product was degassed at 200° C. for ~12 hours before BET measurement; the other half of the reaction product was treated in an oven at 300° C. for 6 hours. The pore size distribution curves of the two samples measured by BET are shown in FIG. 3. As one can see, both samples exhibit substantially bimodal pore size distribution. However, the sample degassed at 200° C. for 12 hours has a smaller pore size modal centered at 2.7 nm, while for the sample treated in an oven at 300° C. for 6 hours, the pore size distribution modal increased to 5.4 nm. The larger pore size modal is also increased by a few nanometers. Other measurement data indicated that the 200° C. sample exhibited a surface area 308 $m^2$/g, a pore volume of 0.52 $cm^3$/g, and a crystallite size (XRD) of 6.6 nm for the sample before thermal treatment in an oven. For the 300° C. sample, surface area was 128 $m^2$/g, pore volume was 0.46 $cm^3$/g and crystallite size (XRD) was 11.3 nm before thermal treatment in an oven.

Example 3

Figure 4:
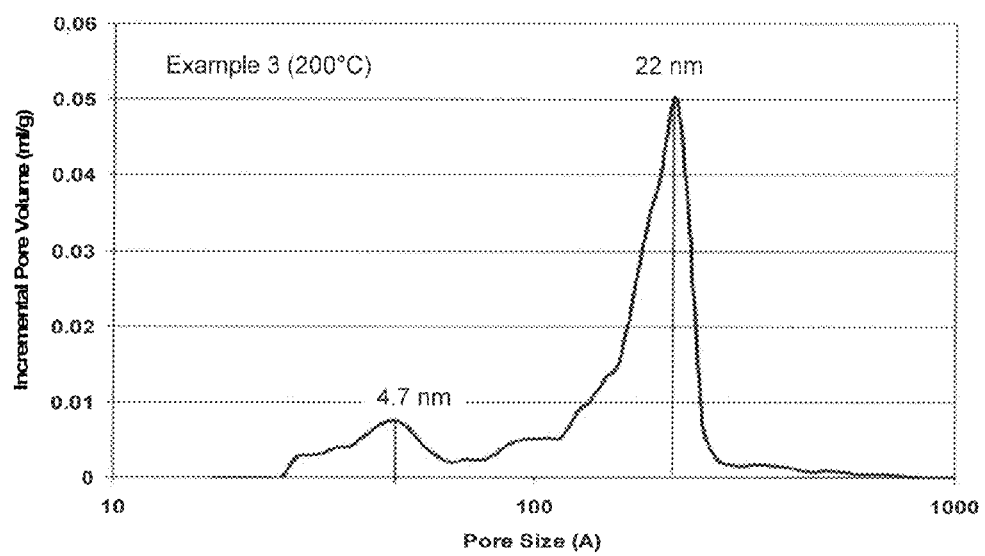
FIG. 4 is a pore size distribution plot of the $TiO_2$ nanoparticles produced according to the inventive concepts described in Example 3.

A TiO$_2$ nanoparticle sample was produced as described above in Example 1 except that anatase seeds were not used. The product was degassed at 200° C. for about 12 hours before BET measurement. A plot of the pore size distribution for the sample, measured by BET, is shown in FIG. 4. The plot also shows a bimodal pore size distribution with the smaller pore size modal being centered at 4.7 nm and the larger pore size modal being centered at 22 nm. The sample had a surface area of 218 $m^2$/g, a pore volume of 0.2 $cm^3$/g, and a crystallite size (XRD) of 6.3 nm.

Example 4

Figure 5:
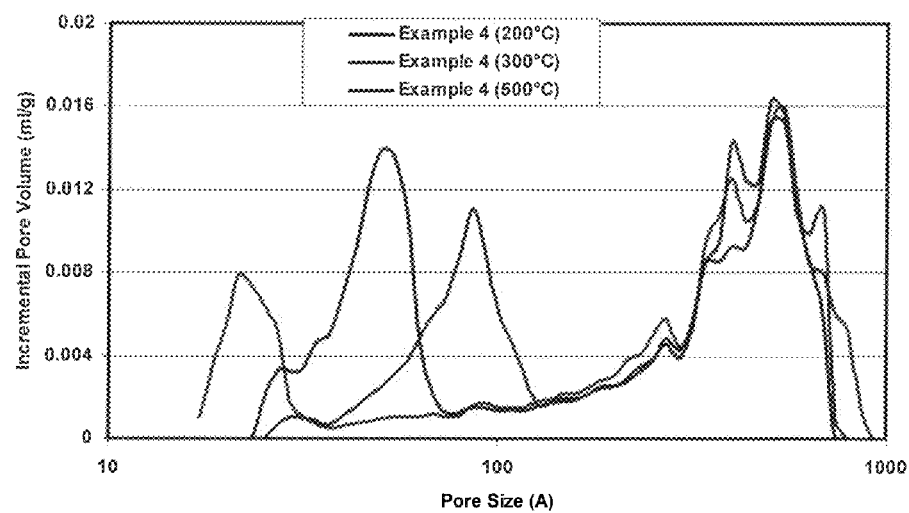
FIG. 5 is a pore size distribution plot of the $TiO_2$ nanoparticles produced according to the inventive concepts described in Example 4.

TiO$_2$ nanoparticle samples were produced as described above Example 1 except that no seeds were used, and 6.6 g of citric acid monohydrate was added instead of 5.9 g. One third of the reaction product was degassed at 200° C. for about 12 hours before BET measurement. Another third of the reaction product was treated in an oven at 300° C. for 6 hours, and the last third of the reaction product was treated in an oven at 500° C. for 6 hours. Pore size distribution plots for the three samples measured by BET are shown in FIG. 5. All three samples exhibit substantially bimodal pore size distribution. However, the sample that was degassed at 200° C. exhibits a pore size modal centered at 2.2 nm, whereas the sample treated in an oven at 300° C. exhibits a somewhat larger pore size modal centered at 5.4 nm. The sample treated in an oven at 500° C. exhibits an even larger pore size modal centered at 8.6 nm. Surface area for the 200° C. sample was measured at 262 $m^2$/g, and pore volume was measured at 0.28 $cm^3$/g. Surface area for the 300° C. sample was measured at 115 $m^2$/g, and pore volume was measured at 0.32 $cm^3$/g. Surface area for the 500° C. sample was measured at 58 $m^2$/g, and pore volume was measured at 0.27 $cm^3$/g. Crystallite size (XRD) was 6.4 nm for the first sample before thermal treatment, 11.2 nm for the 300° C. sample, and 19.2 nm for the 500° C. sample.

TiO$_2$ nanoparticles produced according to the invention demonstrate improved consistent particle morphology, uniform particle size, and contain substantially uniform intra-particle pores in the mesopore size range.

What is claimed is:

1. A method for producing generally uniform TiO$_2$ nanoparticles of from 20 nm to 100 nm in size wherein each particle contains generally uniform pores in the mesopore size range having a generally narrow pore size distribution centered at a value between about 2 nm to about 12 nm comprising:
   (i) forming an aqueous solution of a water soluble compound of titanium at a concentration of from 0.5 to 1.5 moles per liter in the presence of an alpha hydroxyl carboxylic acid at an acid to titanium molar ratio of from 0.02 to 0.2;
   (ii) heating the aqueous solution to a temperature in the range of from 70° C. to 80° C. and maintaining that temperature for a period of from 1 hour to 3 hours, and then heating the aqueous solution to a temperature in the range of from 100° C. up to the refluxing temperature and maintaining that temperature for an additional period of from 2 hours to 4 hours;
   (iii) cooling the solution to room or ambient temperature, and separating the reaction product.

2. The method of claim 1 wherein the reaction product is separated by (i) filtering; (ii) washing the separated reaction product to remove salts generated during the reaction sequence; and (iii) finishing the product by drying whereby water and organic contents are removed.

3. Method of claim 2 wherein finishing is achieved by heating the product at an elevated temperature in the range of from 200° C. to 500° C. under a flow of air.

4. The method of claim 1, claim 2 or claim 3 wherein heating the aqueous solution to a temperature in the range of from 70° C. to 80° C. and maintaining that temperature for a period of from 1 hour to 3 hours according to step (ii) is conducted concurrently with adding anatase TiO$_2$ seeds to the aqueous solution at a seed to TiO$_2$ molar ratio of from 0.0005 to 0.0015.

* * * * *